United States Patent
Bowie et al.

(10) Patent No.: US 11,677,864 B2
(45) Date of Patent: Jun. 13, 2023

(54) COMMUNICATING NETWORK FLOW DATA USING A NETWORK PROTOCOL

(71) Applicant: International Business Machines Corporation, Armonk, NY (US)

(72) Inventors: Dale Bowie, Benowa (AU); Sophia Sampath, Fredericton (CA)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/123,171

(22) Filed: Dec. 16, 2020

(65) Prior Publication Data

US 2022/0191308 A1 Jun. 16, 2022

(51) Int. Cl.
*H04L 29/06* (2006.01)
*H04L 69/22* (2022.01)
*H04L 69/322* (2022.01)
*H04L 69/16* (2022.01)

(52) U.S. Cl.
CPC ............ *H04L 69/22* (2013.01); *H04L 69/161* (2013.01); *H04L 69/322* (2013.01)

(58) Field of Classification Search
CPC ..... H04B 10/27; H04B 10/40; H04L 12/4633; H04L 12/4641; G06N 5/027
See application file for complete search history.

(56) References Cited

U.S. PATENT DOCUMENTS

| 2014/2543511 | | 9/2014 | Newman | |
| 2016/0150058 A1* | | 5/2016 | Wentink | H04L 69/321 |
| | | | | 370/474 |
| 2016/0234752 A1* | | 8/2016 | Hsu | H04L 12/4641 |
| 2018/0183723 A1* | | 6/2018 | Cariou | H04L 69/22 |
| 2018/0307833 A1 | | 10/2018 | Noeth | |
| 2019/0182101 A1 | | 6/2019 | Kulshreshtha | |

(Continued)

FOREIGN PATENT DOCUMENTS

| CN | 104506365 A | 4/2015 |
| CN | 105594216 A | 5/2016 |

OTHER PUBLICATIONS

"IEEE-SA Standards Board Draft Standard for Wireless Medium Access Control (MAC) and Physical Layer (PHY) Specications for Peer Aware Communications (PAC)" IEEE Standards Association, IEEE Computer Society, IEEE Std 802.15.8™-2017, Approved on Dec. 6, 2017, 322 pgs.

(Continued)

*Primary Examiner* — Mansour Oveissi
(74) *Attorney, Agent, or Firm* — David B. Woycechowsky

(57) ABSTRACT

A computer-implemented method comprising: (i) defining a new ethertype to be used in communicating PIDs (process identification codes), with the new ethertype being assigned a new ethertype code; (ii) determining a selected abstraction layer from a plurality of abstraction layers to be used in communicating PIDs; and (iii) making a plurality of network communications among and between computers of a networked computers system, with each communication, with the making of each given communication including: (a) inserting the new ethertype code and a PID of a process causing the given communication to occur into a data structure, and (b) communicating the data structure between computers of the networked computers system at the selected abstraction layer.

3 Claims, 4 Drawing Sheets

(56) References Cited

U.S. PATENT DOCUMENTS

| | | |
|---|---|---|
| 2020/0052985 A1 | 2/2020 | Ball |
| 2020/0076773 A1* | 3/2020 | Monat .................. G09C 1/00 |
| 2020/0136938 A1 | 4/2020 | Atkinson |
| 2020/0170043 A1* | 5/2020 | Fu .................. H04W 74/004 |
| 2020/2136831 | 7/2020 | Woosuk |

OTHER PUBLICATIONS

"Notification of Transmittal of the International Search Report and the Written Op Inion of the International Searching Authority,or the Declaration", From the International Searching Authority, International application No. PCT/CN2021/130898, dated Feb. 10, 2022, 8 pages.

"IEEE Standards for Local and Metropolitan Area Networks: Virtual Bridged Local Area Networks", IEEE Std 802.1Q-1998, LAN MAN Standards Committee of the IEEE Computer Society, Approved Dec. 8, 1998, 211 pages.

Osquery | Easily ask questions about your Linux, Windows, and macOS, printed on Jun. 3, 2020, 1 page, <https://osquery.io/>.

"Production-Grade Container Orchestration—Kubernetes", printed on Jun. 3, 2020, 1 page, <https://kubernetes.io/>.

"Runtime Security | Sysdig", Copyright 2020 Sysdig, Inc., 10 pages, <https://sysdig.com/products/kubernetes-security/runtime-security/>.

"SysFlow • GitHub", Cloud-native system telemetry pipeline, printed on Jun. 2, 2020, 1 page, <https://github.com/sysflow-telemetry >.

Russinovich et al., "Sysmon—Windows Sysinternals | Microsoft Docs", Published: Apr. 28, 2020, 11 pages, <https://docs.microsoft.com/en-us/sysinternals/downloads/sysmon>.

\* cited by examiner

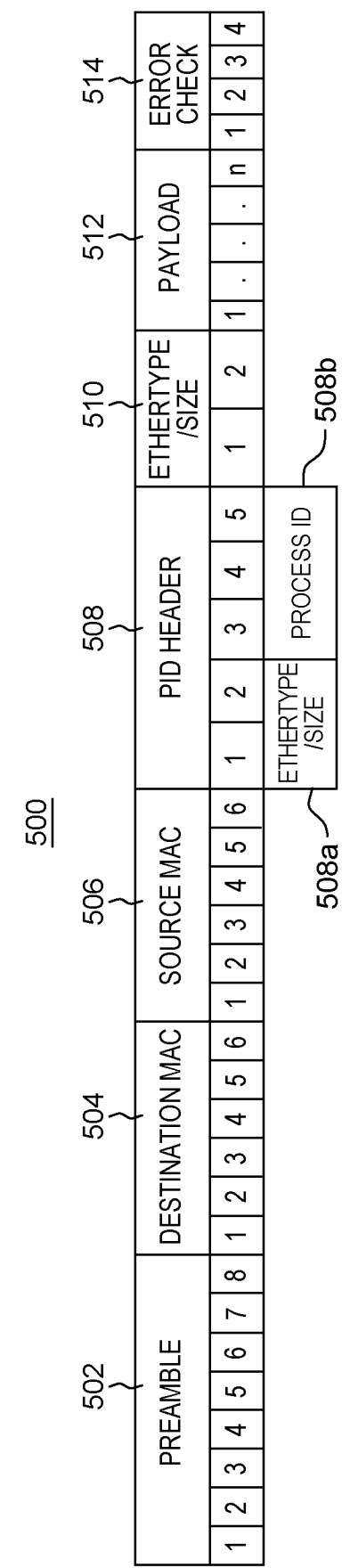

COMMUNICATING NETWORK FLOW DATA USING A NETWORK PROTOCOL

BACKGROUND

The present invention relates generally to the field of computer networking, and more particularly to networking data sources.

The Wikipedia entry for "abstraction layer" (as of Nov. 16, 2020) states as follows: "In computing, an abstraction layer or abstraction level is a way of hiding the working details of a subsystem, allowing the separation of concerns to facilitate interoperability and platform independence. Examples of software models that use layers of abstraction include the OSI model for network protocols, OpenGL and other graphics libraries. In computer science, an abstraction layer is a generalization of a conceptual model or algorithm, away from any specific implementation. These generalizations arise from broad similarities that are best encapsulated by models that express similarities present in various specific implementations. The simplification provided by a good abstraction layer allows for easy reuse by distilling a useful concept or design pattern so that situations where it may be accurately applied can be quickly recognized. A layer is considered to be on top of another if it depends on it. Every layer can exist without the layers above it, and requires the layers below it to function. Frequently abstraction layers can be composed into a hierarchy of abstraction levels. The OSI model comprises seven abstraction layers. Each layer of the model encapsulates and addresses a different part of the needs of digital communications, thereby reducing the complexity of the associated engineering solutions."

The Wikipedia entry for "open systems interconnect protocol" (as of Nov. 16, 2020) states as follows: "The Open Systems Interconnection protocols are a family of information exchange standards developed jointly by the ISO and the ITU-T. . . . The OSI protocol stack is structured into seven conceptual layers. The layers form a hierarchy of functionality starting with the physical hardware components to the user interfaces at the software application level. Each layer receives information from the layer above, processes it and passes it down to the next layer. Each layer adds encapsulation information (header) to the incoming information before it is passed to the lower layer. Headers generally include address of source and destination, error control information, protocol identification and protocol parameters such as flow control options and sequence numbers. Layer 1: physical layer This layer deals with the physical plugs and sockets and electrical specification of signals only. This is the medium over which the digital signals are transmitted. It can be twisted pair, coaxial cable, optical fiber, wireless, or other transmission media. Layer 2: data link layer The data link layer packages raw bits from the physical layer into frames (logical, structured packets for data) . . . . This layer is responsible for transferring frames from one host to another. It might perform error checking. . . . Layer 3: network layer . . . This level is in charge of transferring data between systems in a network, using network-layer addresses of machines to keep track of destinations and sources. This layer uses routers and switches to manage its traffic (control flow control, error check, routing etc.) So here it takes all routing decisions, it deals with end to end data transmission. Layer 4: transport layer . . . The transport layer transfers data between source and destination processes. Generally, two connection modes are recognized, connection-oriented or connectionless. . . . Layer 5: session layer . . . The session layer controls the dialogues (connections) between computers. It establishes, manages and terminates the connections between the local and remote application. It provides for full-duplex, and half-duplex or simplex operation, and establishes checkpointing, adjournment, termination, and restart procedures. . . . Layer 6: presentation layer . . . This layer defines and encrypts/decrypts data types from the application layer. Protocols such as MIDI, MPEG, and GIF are presentation layer formats shared by different applications. Layer 7: application layer. . . . This keeps track of how each application talks to another application. Destination and source addresses are linked to specific applications."

The Wikipedia entry for "EtherType" (herein sometimes referred to as "ethertype," as of Nov. 16, 2020) states as follows: "EtherType is a two-octet field in an Ethernet frame. It is used to indicate which protocol is encapsulated in the payload of the frame and is used at the receiving end by the data link layer to determine how the payload is processed. The same field is also used to indicate the size of some Ethernet frames. The EtherType is also used as the basis of 802.1Q VLAN tagging, encapsulating packets from VLANs for transmission multiplexed with other VLAN traffic over an Ethernet trunk. . . . An Ethernet frame including the EtherType field. Each lower slot designates an octet; the EtherType is two octets long. In modern implementations of Ethernet, the field within the Ethernet frame used to describe the EtherType can also be used to represent the size of the payload of the Ethernet Frame. . . . With the advent of the IEEE 802 suite of standards, a Subnetwork Access Protocol (SNAP) header combined with an IEEE 802.2 LLC header is used to transmit the EtherType of a payload for IEEE 802 networks other than Ethernet, as well as for non-IEEE networks that use the IEEE 802.2 LLC header, such as FDDI. However, for Ethernet, Ethernet II framing is still used. . . . " (footnotes omitted)

The Wikipedia entry for "protocol stack" (as of 6 Dec. 2020) states as follows: "The protocol stack or network stack is an implementation of a computer networking protocol suite or protocol family. Some of these terms are used interchangeably but strictly speaking, the suite is the definition of the communication protocols, and the stack is the software implementation of them. . . . Individual protocols within a suite are often designed with a single purpose in mind. This modularization simplifies design and evaluation. Because each protocol module usually communicates with two others, they are commonly imagined as layers in a stack of protocols. The lowest protocol always deals with low-level interaction with the communications hardware. Each higher layer adds additional capabilities. User applications usually deal only with the topmost layers. . . . In practical implementation, protocol stacks are often divided into three major sections: media, transport, and applications. A particular operating system or platform will often have two well-defined software interfaces: one between the media and transport layers, and one between the transport layers and applications. The media-to-transport interface defines how transport protocol software makes use of particular media and hardware types and is associated with a device driver. . . . Example protocol stack and corresponding layers[:]

| Protocol | Layer |
| --- | --- |
| HTTP | Application |
| TCP | Transport |
| IP | Internet or network |
| Ethernet | Link or data link |
| IEEE 802.3ab | Physical." (footnotes omitted) |

SUMMARY

According to an aspect of the present invention, there is a method, computer program product and/or system that performs the following operations (not necessarily in the following order): (i) defines a new ethertype to be used in communicating PIDs (process identification codes), with the new ethertype being assigned a new ethertype code; (ii) determines a selected abstraction layer from a plurality of abstraction layers to be used in communicating PIDs; and (iii) makes a plurality of network communications among and between computers of a networked computers system, with each communication, with the making of each given communication including: (a) inserts the new ethertype code and a PID of a process causing the given communication to occur into a data structure, and (b) communicates the data structure between computers of the networked computers system at the selected abstraction layer.

BRIEF DESCRIPTION OF THE DRAWINGS

FIG. 4 is a diagram of a syntax for packets of the kind generated by the first embodiment system;

FIG. 5 is a diagram of a syntax for packets of the kind generated by various embodiments of the present invention.

DETAILED DESCRIPTION

Figure 1:
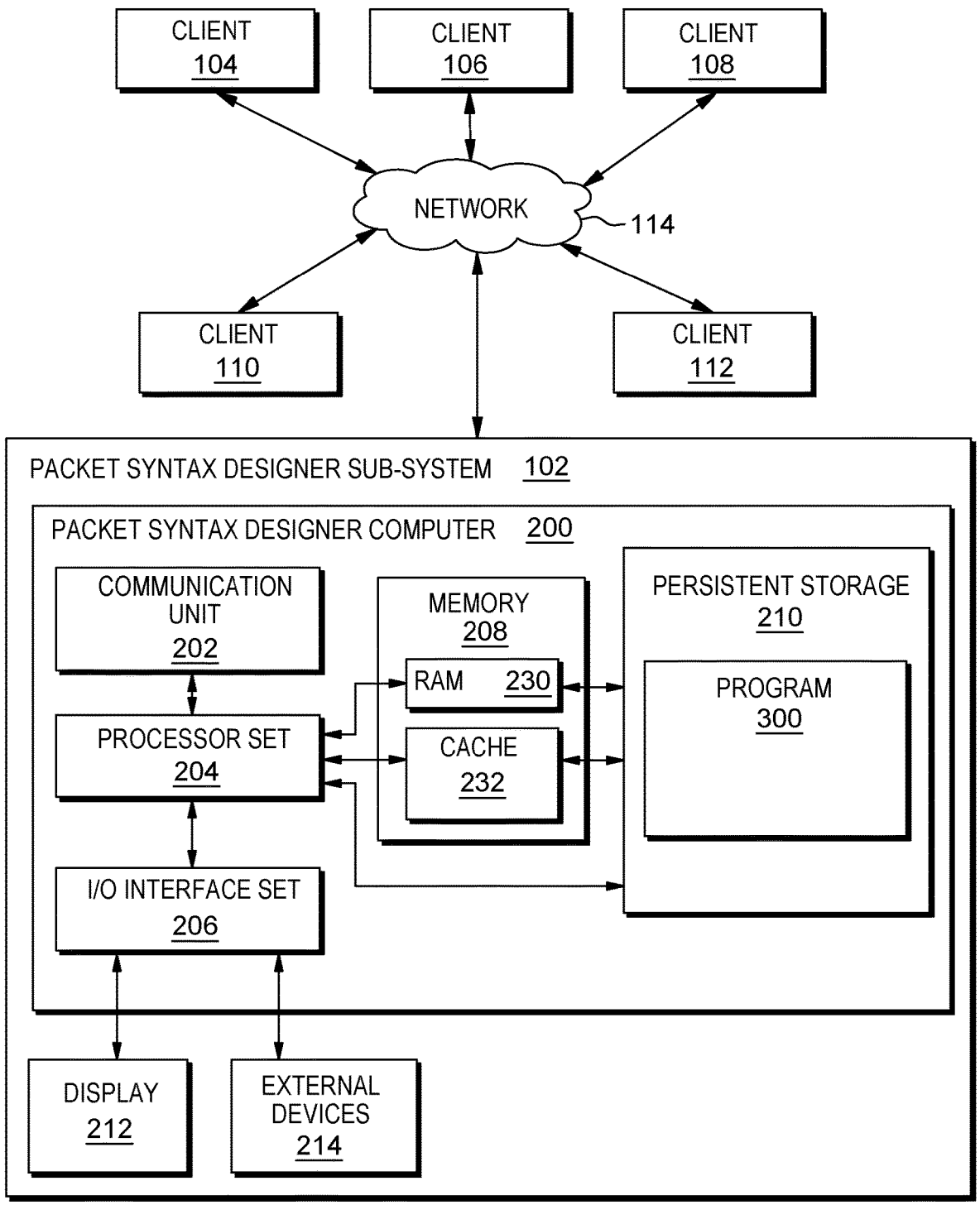
FIG. 1 is a block diagram view of a first embodiment of a system according to the present invention.

This Detailed Description section is divided into the following subsections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: packet syntax designer subsystem 102 (sometimes herein referred to, more simply, as subsystem 102); client subsystems 104, 106, 108, 110, 112; and communication network 114. Subsystem 102 includes: packet syntax designer computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with packet syntax designer computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
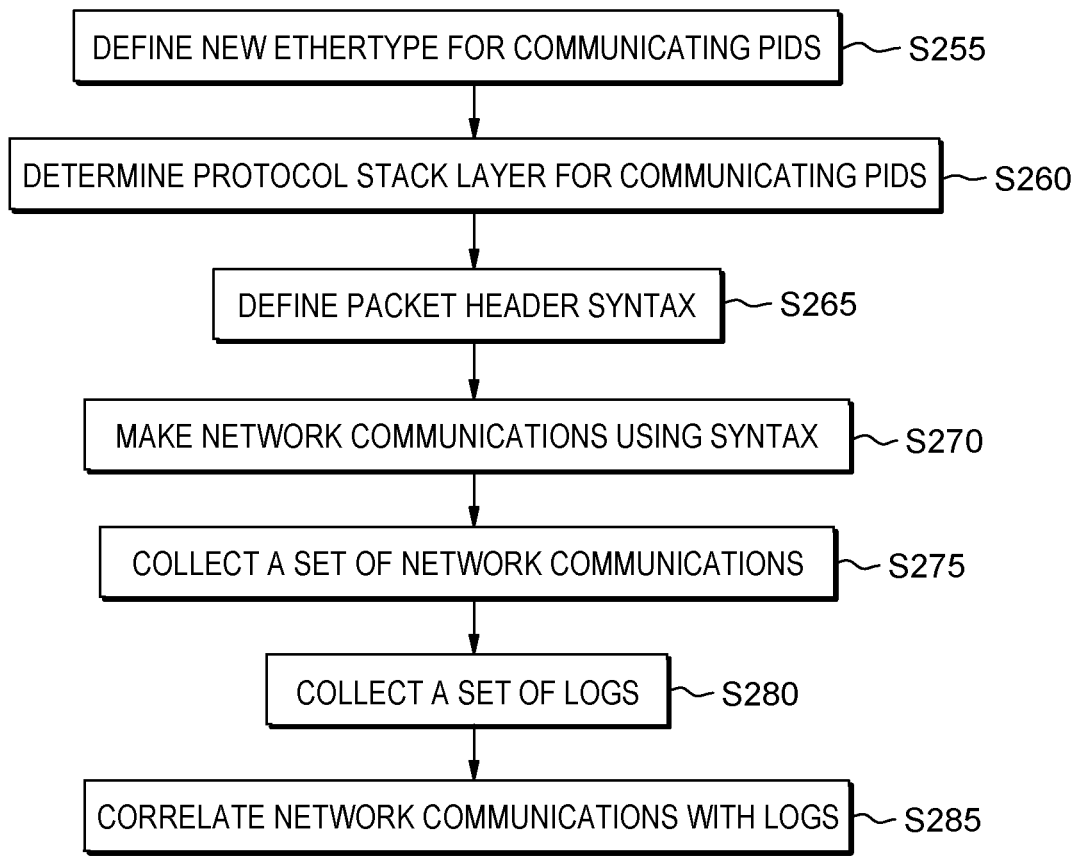
FIG. 2 is a flowchart showing a first embodiment method performed, at least in part, by the first embodiment system.
Figure 3:
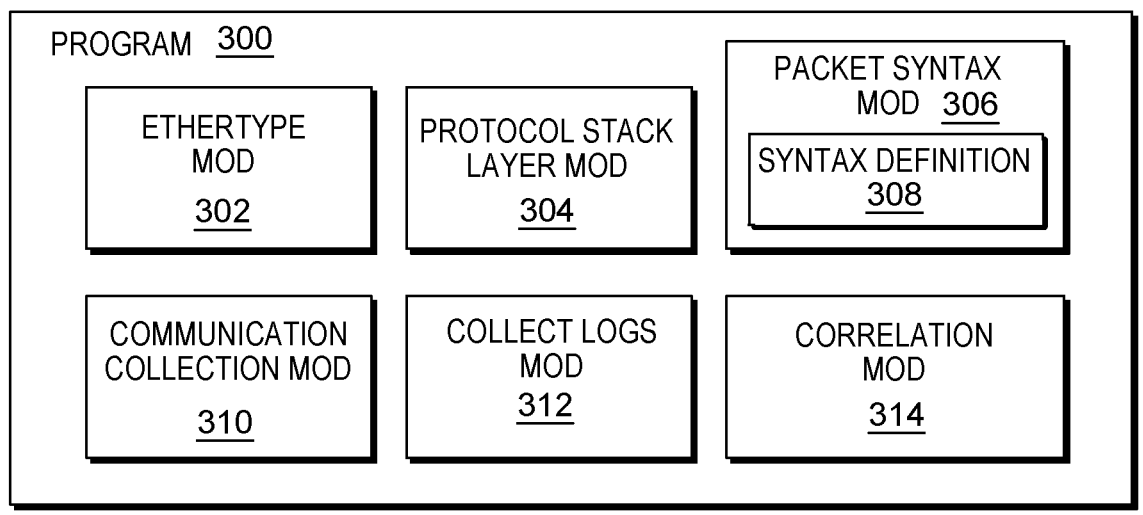
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation 5255, where ethertype module ("mod") 302 defines a new ethertype (see Definition in the Background section) for communicating process id values (PIDs) associated with a given packet in the header of the packet itself. As can be seen from the diagram of a syntax definition 308, shown in FIG. 4, for packets generated by this example, the ethertype id for this new ethertype is three bytes in length. Alternatively, the new ethertype id can be two bytes in length.

Processing proceeds to operation 5260, where protocol stack layer mod 304 decides the layer(s) of the protocol suite through which the PIDs will be communicated when the network is implemented using a protocol stack according to the protocol suite. In embodiments that use the OSI protocol suite, the protocol layers that may be chosen are as follows: (i) transport layer protocol; (ii) network layer protocol; (iii) data link layer protocol; and/or (iv) physical layer protocol. In this example, the PIDs will be communicated only in packet headers of packets made according to a packet syntax definition for packets made according to the transport layer protocol (that is, transmission control protocol (TCP)) at the transport layer of abstraction (see definition of abstraction layers, above, in the Background section). Alternatively and/or additionally, other layers, from among the four layers listed above, may have PIDs inserted into definitions of their packets, frames and/or other associated units of data.

Processing proceeds to operation 5265 where packet syntax mod 306 generates syntax definition 308 for TCP packets to be communicated over communication network 114 during normal operations. A detailed block diagram of this packet syntax is shown in FIG. 4. Other types of syntax (for example, ordering of header fields, byte allocations) that include a place for communication of the PID values may be used. For example, FIG. 5, which will be discussed in the next subsection of this Detailed Description section shows a different packet syntax definition for use in other embodiment(s) of the present invention.

Processing proceeds to operation 5270 (sometimes referred to as "normal operations") where network communications are made among and between client subsystems 104, 106, 108, 110 and 112. As these communications take place in normal operations, two things occur: (i) logs are kept at the various client subsystems (as is currently conventional); and (ii) data is communicated, including communication of many TCP packets that are formed and encapsulated according to syntax definition 308 (which includes the PID in its header). More specifically in regard of item (ii) on the foregoing list, each TCP packet for communicating data at the transport layer is generated pursuant to a "process." Each process has its own PID, and the process that causes the generation of a given TCP packet to occur will have its associated PID placed into the given TCP packet header according to syntax definition 308.

Processing proceeds to operation 5275, where communication collection mod 310 collects up a set of network communications for analysis (for example, a glitch or crash may have occurred during normal operations of networked computer system 100). In this example, this means collecting TCP packets that were communicated during normal operations.

Processing proceeds to operation 5280, where collect logs mod 312 collects up the logs generated and maintained by client subsystems 104, 106, 108, 110 and 112.

Processing proceeds to operation 5285, where correlation mod 314 correlates the PIDs occurring in various log data with the PIDs of the headers of the TCP packets. The purpose and benefit of this correlation operation will be discussed in detail in the next subsection of this Detailed Description section.

III. FURTHER COMMENTS AND/OR EMBODIMENTS

Some embodiments of the present invention recognize the following facts, potential problems and/or potential areas for improvement with respect to the current state of the art: (i) an effective security intelligence and event management system relies on a combination of event logs and network flow data; (ii) event logs give visibility into the processes running on a particular host (for example, web server logs, proxy logs, mail servers, windows domains, VPN (virtual private network) services, intrusion detection systems (IDS), intrusion prevention systems (IPS) and other network security products); (iii) has the ability to connect to other sequential data sources, such as databases, to pull logs from those as well; (iv) event logs are uniquely identified by a process ID (PID) in use over a particular time span for a given host IP (internet protocol) address; (v) network flow data gives visibility to everything that is traversing the network, uniquely identified by at minimum a combination of source IP, source port, destination IP, destination port and protocol over a particular time span; (vi) the only correlation that can be performed between two data sources is via an IP address performing an action within a specified time window; (vii) it is desirable to be able to correlate these actions further so that one can determine which PID triggered network flows or vice versa; (viii) existing solutions that help solve this problem involve active monitoring on an endpoint for its network connections to be able to correlate that to a given PID; (ix) while these solutions are useful, they have processes that generate high-traffic data which can result in performance degradation of ingesting real-time events; (x) duplication of existing event data, as queries, may be regenerated due to performance issues; (xi) solutions do not satisfy the goal of correlating event data to a given PID; and/or (xii) there are many examples of log sources that can provide process-level information including: osquery, SysFlow, Kubernetes, Sysdig and Sysmon.

Some embodiments of the present invention may include one, or more, of the following operations, features, characteristics and/or advantages for improvement with respect to the correlation that can be performed between event logs and network flow data: (i) uses existing commercially available software; (ii) correlation can be performed between event logs and network flow data logs of all network connections at the endpoint itself; (iii) utilizes a kernel module to capture and log; (iv) all of the network communications are established (among other system endpoint information); and/or (v) even reducing this to just the flow session identifier and PID, this would typically require at least sixteen (16) bits of memory exclusive of additional bytes that would be required for the transfer of this information to the STEM (security information and event management) endpoint.

Some embodiments of the present invention may include one, or more, of the following operations, features, characteristics and/or advantages: (i) embeds the process ID (PID) in network traffic; (ii) the embedding of the PID in a stacked EtherType in the header of packets in a similar style to IEEE (institute of electrical and electronics engineers) 802.1Q/802.1AD for VLAN (virtual local area network) tags; (iii) in Linux-based systems, the maximum number of PIDs is 2^22, meaning this could be embedded in a three (3) byte field; and/or (iv) when including the additional "EtherType" required for the underlying protocol, this would amount to a total of five (5) bytes of memory being added to network packets.

Some embodiments of the present invention may include one, or more, of the following operations, features, characteristics and/or advantages: (i) in many cases, an enterprise already has management control over the devices on their network which includes but is not limited to: laptops, servers and networking devices (for example, routers and firewalls); (ii) is feasible to implement as a network protocol, handled entirely on the internal network where kernel modules could be added to the endpoints to inject their PIDs into the network traffic; (iii) add other modules to the networking devices prior to routing the network traffic to a wider ethernet (larger segment of a corporate network, or the internet itself at large); and/or (iv) visibility could be gained on the internal network without affecting compatibility with external communications, (for example, similar management of internal verses external network protocols is already performed with VLANs).

Some embodiments of the present invention may include one, or more, of the following operations, features, characteristics and/or advantages: (i) very little additional data needs to be transferred from the endpoint itself (only five (5) bytes as described above); (ii) can be managed on the internal network without affecting packets outside the network; and/or (iii) individual processes on the endpoint do not need to be modified, only the kernel through a module.

As shown in FIG. 5, packet syntax definition 500 includes: preamble portion 502 (8 bytes long); destination media access control (MAC) address portion 504 (6 bytes long); source MAC address portion 506 (6 bytes long); process id (PID) portion 508 (including PID ethertype/size portion 508a (2 bytes long) and PID portion 508b (3 bytes long), packet level ethertype/size portion 510 (2 bytes long); payload portion 512 (many, many bytes in length); and error check portion 514 (4 bytes long). It is notable that in this embodiment, the PID ethertype/size portion is two bytes in length, while the process ID is 3 bytes in length.

Figure 6:
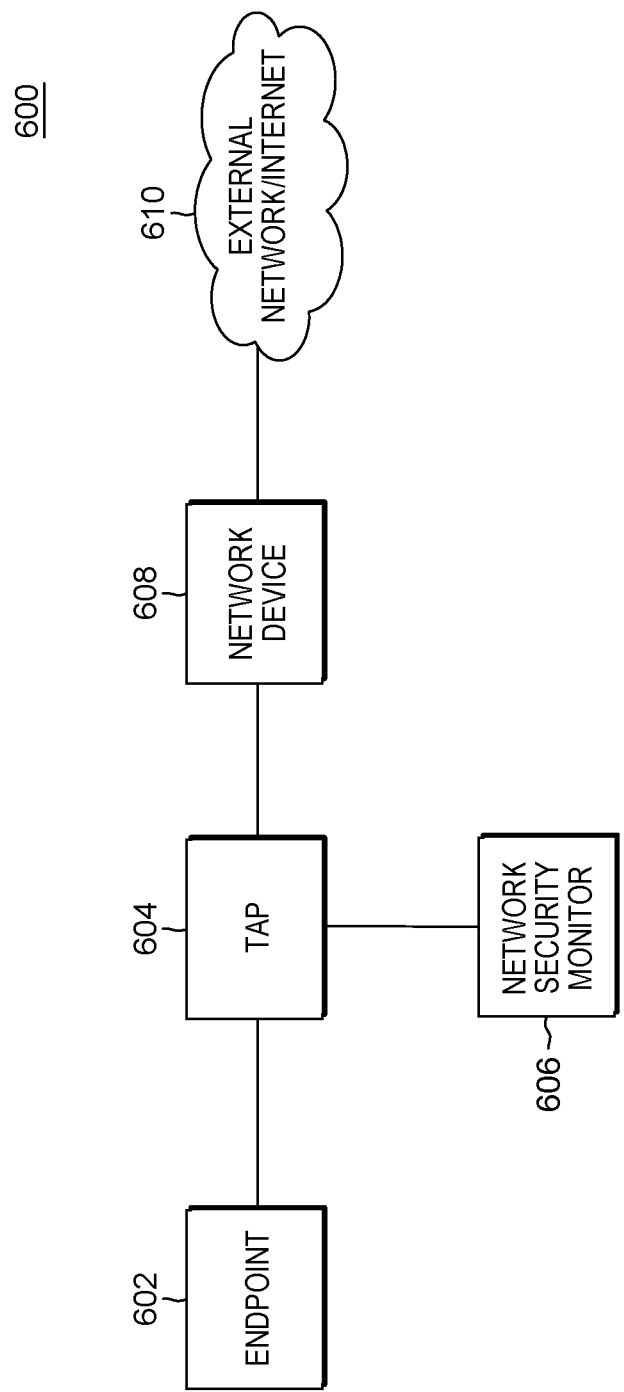
FIG. 6 is a block diagram view of a first embodiment of a system according to the present invention.

As shown in FIG. 6, system 600 includes the following system components: endpoint computer 602; TAP (a network tap) block 604; network security monitor computer 606; network device 608; and external network/internet 610. Endpoint computer 602 is used with new kernel module (that is, TAP block 604) for this new network protocol. Network security monitoring computer 606 (such as a computer equipped with commercially available SIEM products) for reading packets and creating bi-directional flow records, where this device feeds flow information into a SIEM tool for correlation. In this embodiment, network device 608 is a router with knowledge of the new network protocol. External network/internet 610 does not necessarily have knowledge of the network protocol of FIG. 5.

An embodiment of a method according to the present invention includes the following operations: (i) endpoint process initiates a network connection where kernel module inserts a PID; (ii) packet traverses the internal network; (iii) packet is mirrored to a network security monitoring tool by a TAP device (this could also be a SPAN (switched port analyzer) port on a switch) where at this point the PID is now correlated with a flow session identifier (at minimum a source IP, source port, destination IP, destination port and protocol) and this pre-correlated information can be fed directly into a SIEM tool; (iv) packet continues to traverse the internal network to an edge network device; (v) the edge networking device removes the new network protocol and forwards the packet with only the original underlying information; (vi) packet continues on route to its final destination; (vii) response packet(s) traverse back through the network route; (viii) response packet(s) are also mirrored to the network security endpoint for bi-directional flow correlation; (ix) packets can automatically be correlated to the request packets which featured the PID, since their network flow tuple will be the same; and/or (x) response packet(s) are received and processed by the endpoint host.

While some conventional technology embeds a "packet tag" into an IP options header, it is noted that this tag is not the PID itself. To achieve correlation between process log and network flows, some embodiments of the present invention may use the following method: (i) extract packet tag; (ii) correlate packet tag to PID; and/or (iii) correlate PID to event logs.

Some embodiments of the present invention may include one, or more, of the following operations, features, characteristics and/or advantages: (i) performs correlation down to the individual process level, and not merely at the host level; and/or (ii) does not require any correlation operations to take place because the PID is communicated directly, as "raw network traffic."

An embodiment of a method according to the present invention is for use with a security intelligence and event management computer system (SIEMCS) including a first host computer device and a network. The method includes the following operations (not necessarily in the following order): (i) generating, on the first host computer device, a first event log including information indicative of operations of the first host computer device; (ii) assigning a first process ID (PID) code to the first event log; (iii) using the first PID code during a period of time over for an internet protocol (IP) address associated with the first host computer device; (iv) collecting a network flow data set that includes information indicative of at least the following: source IP of each given communication, source port of each given communication, destination IP of each given communication, destination port of each given communication, and protocol of each given communication; and/or (v) determining that the first host computer device, identified by the first PID code, triggered a first network flow based upon the first PID code, the first event log and the network flow data set.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
defining a new ethertype to be used in communicating PIDs (process identification codes by assigning a new unique code to designate the new ethertype which new unique code is a two-octet field value in used in Ethernet frame communications of data;
determining a selected abstraction layer from a plurality of abstraction layers to be used in communicating PIDs; and
making a plurality of network communications among and between computers of a networked computers system, with each communication, with the making of each given communication including:
inserting, into a header of a packet, the new unique code to indicate that a PID is being communicated according to a dedicated protocol,
further inserting a information identifying the PID into a payload of the packet according to the predetermined protocol, and
communicating the packet between computers of the networked computers system at the selected abstraction layer.

2. A computer program product (CPP) comprising:
a set of storage device(s); and
computer code stored collectively in the set of storage device(s), with the computer code including data and instructions to cause a processor(s) set to perform at least the following operations:
defining a new ethertype to be used in communicating PIDs (process identification codes by assigning a new unique code to designate the new ethertype which new unique code is a two-octet field value in used in Ethernet frame communications of data,
determining a selected abstraction layer from a plurality of abstraction layers to be used in communicating PIDs, and
making a plurality of network communications among and between computers of a networked computers system, with each communication, with the making of each given communication including:
inserting, into a header of a packet, the new unique code to indicate that a PID is being communicated according to a dedicated protocol,
further inserting a information identifying the PID into a payload of the packet according to the predetermined protocol, and
communicating the packet between computers of the networked computers system at the selected abstraction layer.

3. A computer system (CS) comprising:
a processor(s) set;
a set of storage device(s); and
computer code stored collectively in the set of storage device(s), with the computer code including data and instructions to cause the processor(s) set to perform at least the following operations:
defining a new ethertype to be used in communicating PIDs (process identification codes by assigning a new unique code to designate the new ethertype which new unique code is a two-octet field value in used in Ethernet frame communications of data, determining a selected abstraction layer from a plurality of abstraction layers to be used in communicating PIDs, and making a plurality of network communications among and between computers of a networked computers system, with each communication, with the making of each given communication including:
  inserting, into a header of a packet, the new unique code to indicate that a PID is being communicated according to a dedicated protocol,
  further inserting a information identifying the PID into a payload of the packet according to the predetermined protocol, and
  communicating the packet between computers of the networked computers system at the selected abstraction layer.

* * * * *